July 10, 1928.
E. F. FELTY
EDUCATIONAL CHART
1,676,328
Original Filed June 30, 1925   3 Sheets-Sheet 2
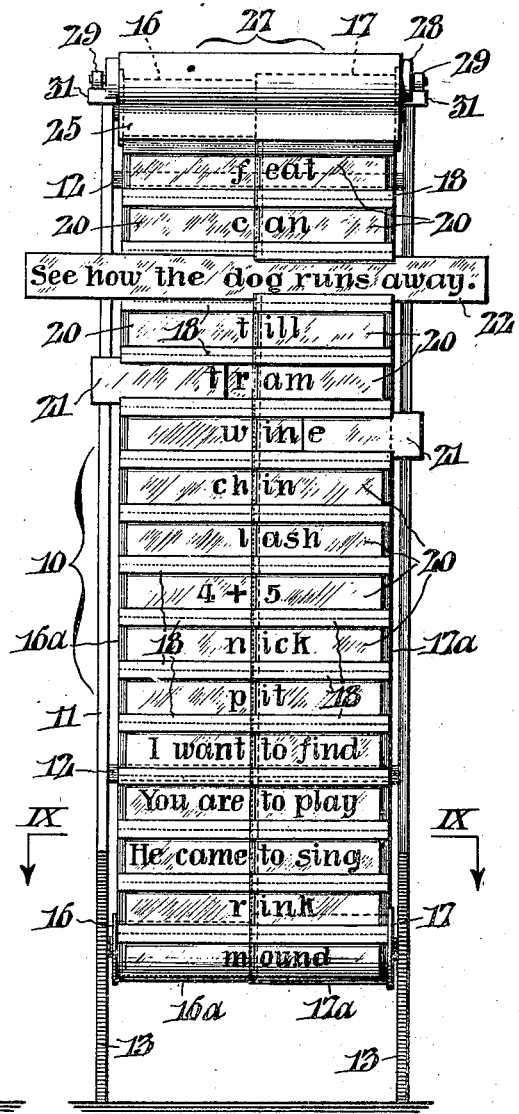
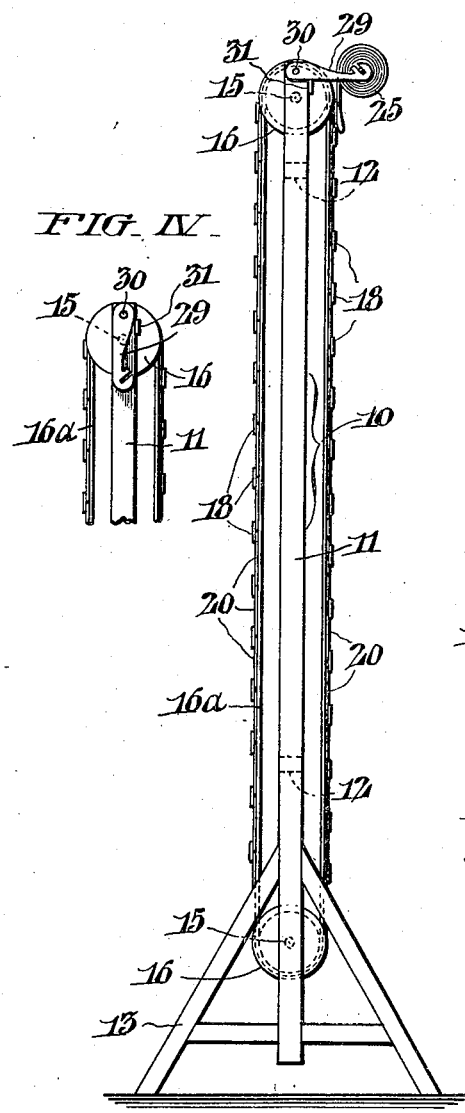
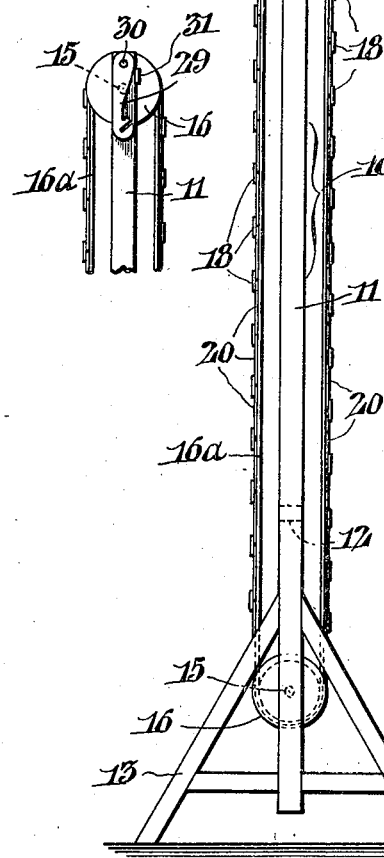
WITNESSES
John E. Bergner
Alfred E. Pschinger
INVENTOR:
Edna F. Felty.
BY Fraley & Paul
ATTORNEYS.

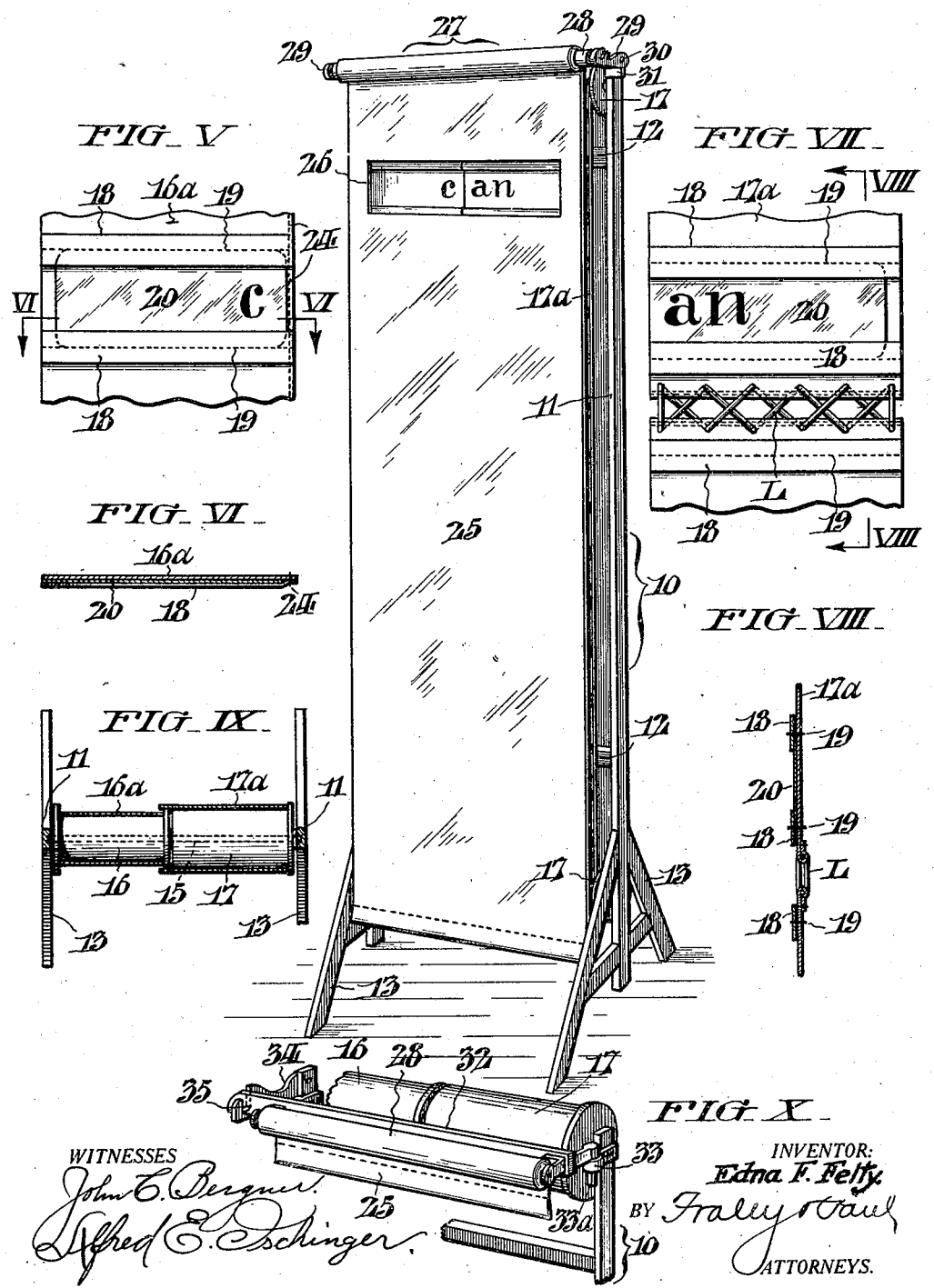

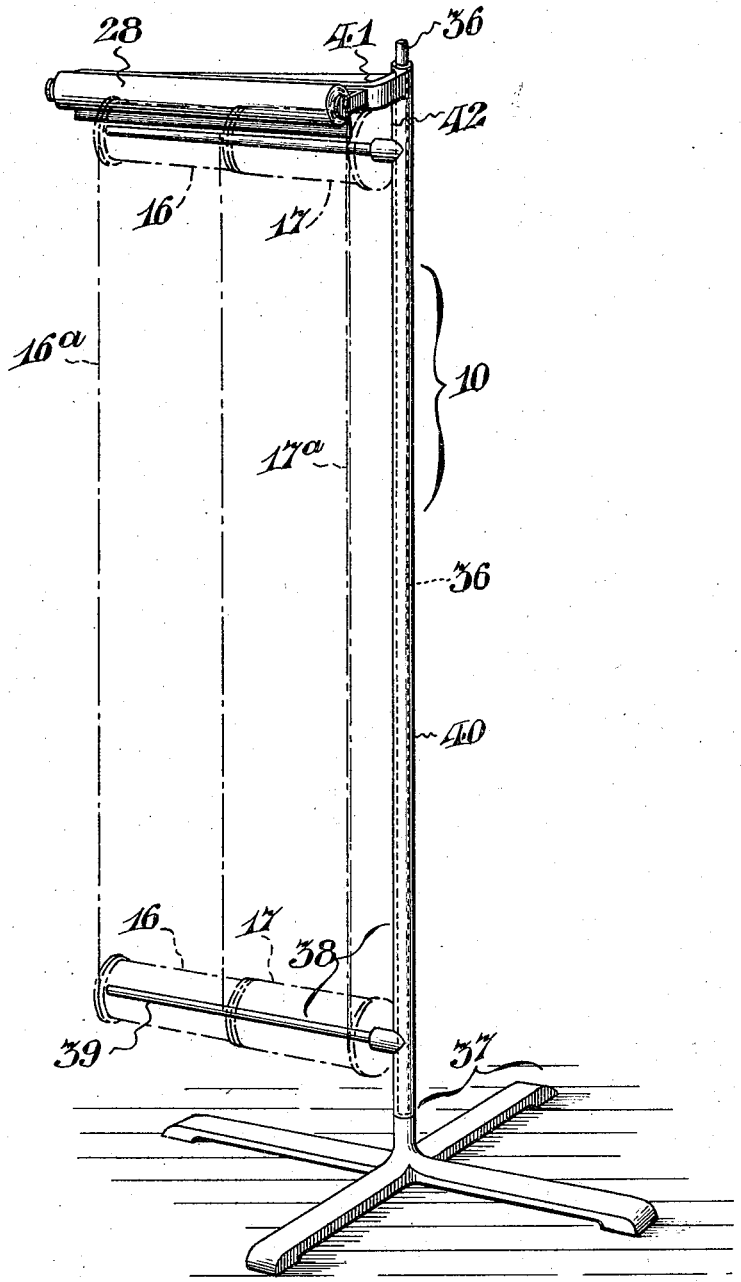

Patented July 10, 1928.

1,676,328

UNITED STATES PATENT OFFICE.

EDNA F. FELTY, OF PHILADELPHIA, PENNSYLVANIA.

EDUCATIONAL CHART.

Application filed June 30, 1925, Serial No. 40,506. Renewed November 30, 1927.

This invention relates to charts useful in pedagogy to facilitate instruction in subjects wherein graphic delineation is practicable as a useful aid to explanation and study.

More specifically speaking this invention has reference to educational charts of the type comprising independently shiftable belts bearing indicia or inscriptions capable of being variously brought into line for the purpose of building words, phrases, and sentences as for example in teaching phonetics; or, in formulating analogous combinations in other kindred subjects.

Briefly stated, the present invention is concerned with refinements which are conducive to rendering the construction of devices of the specified character extremely simple and inexpensive; to facilitating their manipulation with regard to interchange of the inscription or indicia-bearing elements; to enabling the combinations to be altered with the utmost rapidity; and, in general, to adapting such devices for more universal application in pedagogy.

The various advantages just recited, as well as others, are readily realizable, in the manner hereinafter explained, incidental to the use of the typical embodiment of this invention shown by the accompanying drawings, whereof Fig. I is a perspective view of my improved educational chart.

Fig. II is a front elevation of the organization with the front screen raised to expose the underlying parts.

Fig. III is an end elevation as viewed from the left of Fig. II.

Fig. IV is a fragmentary detail view showing the manner in which screen curtain supporting means can be swung out of the way when not in use.

Fig. V is a fragmentary view showing certain important details of one of the inscription bearing belts.

Fig. VI is a section taken as indicated by the arrows VI—VI in Fig. V.

Fig. VII is an illustration similar to Fig. V of the other inscription bearing belt.

Fig. VIII is a section taken as indicated by the arrows VIII—VIII in Fig. VII.

Fig. IX is a cross section of the complete organization taken as indicated by the arrows IX—IX in Fig. II.

Fig. X shows an alternative form of mounting for the screen curtain roller; and

Fig. XI is a perspective view of a support which may be used in place of the one shown in Figs. I and II.

With reference more particularly to Figs. I, II and III 10 designates a support having the form of an open rectangular frame which may conveniently be constructed of wood or other suitable material with vertical end members 11, 11 cross ties or bars 12, as well as feet 13 to support it in upright position as shown. Extending between the verticals 11—11 at the top and near the bottom of the support 10 are rods 15, 15 which serve respectively as common axes for freely rotatable pulleys 16—17, 16—17 that carry endless inscription or indicia-bearing belts 16$^a$, 17$^a$ in juxtaposition and with capacity for independent shifting. These belts 16$^a$, 17$^a$ are preferably made of durable flexible material, lacing such a shown at "L" in Fig. VIII being employed for drawing together the ends of the fabric lengths so that the belts are maintained taut between the upper and lower pulleys 16—17. By reference to Fig. IX it will be particularly noted that the pulleys 17 are larger in diameter than the pulleys 16, just sufficiently so to enable slight marginal overlap between the contiguous ends of the belts 16$^a$, 17$^a$ thereby to avoid a visible break in the continuity of the composite or aggregate display surface jointly afforded by said belts.

Mounted on the belts 16$^a$, 17$^a$ at regularly spaced intervals, are transverse flexible strips 18, preferably of fabric which are secured by a line of stitches 19 along their medials. In this manner I provide on each of the belts 16$^a$, 17$^a$, a series of slideways for retainment of interchangeable cards 20 by which the inscriptions are borne—each strip 18, by virtue of the manner of its fastening, overlapping an adjacent pair of slight ways. In practice, the stitches 19 are made amply loose or slack, as indicated conventionally in Fig. IX of the drawings, to prevent imposition of binding resistance by the strips 18 and consequent interference with ready insertion or removal of the cards 20.

In accordance with this invention, I employ inscription or indicia cards 20 of different lengths to suit the various exigencies of practice, the ones which might conveniently be termed "standard" being shown as corresponding in length substantially to the extent of the slideways of both belts 16ª, 17ª. These cards 20 are convenient for syllables, words, short phrases, etc., as variously exemplified in Fig. II. For initial or final letters, prefixes and suffixes, other cards 21, of shorter length, may be used as supplements for the "standard" cards 20. Then again, for extensive words, phrases or sentences, considerably longer cards such as indicated at 22 may be provided. By judicious selection and arrangement of the cards 20, 21 and 22, and subsequent independent shifting of the belts 16ª, 17ª to effect registry of the various inscriptions, a great number of combinations are possible in "building" words, phrases, sentences, etc. as will be obvious to those skilled in the teaching of phonetics or kindred subjects.

In order to preclude the necessity for exercising extreme care in positioning the cards 20 or 21 in the slideways of the belt 16ª, the inner ends of the guides afforded by the strips 18 are closed to provide limiting stops for abutment of the card ends. Such closure is effected, in the present instance, simply by extending a line of stitches 24 along the inner edge of the belts 16ª, 17ª so as to include the strips 18, in a manner readily apparent from Figs. V and VI. The slideways of the belt 17ª are, however, preferably left open or continuous to afford adequate support for the longer cards 22. In this connection it is important to note that the planal offset of the belt 17ª, with regard to belt 16ª is further advantageous in permitting passage of the protruding portion of a card 22 over, or to the front of, the latter belt during shifting.

For the purpose of avoiding confusion in teaching younger children, it is essential that one word or phonetic combination be displayed at a time. This requirement I meet by utilizing a screen curtain 25 which is hung from the top of the frame 10, and has an elongated horizontal aperture 26 whereto the desired inscriptions may be brought for registry and display by shifting of the respective belts 16ª, 17ª from behind, all other inscriptions remaining concealed.

For convenience and compactness, I associate with the screen curtain 25 a winding means 27 of the type ordinarily employed in connection with window shades, the trunnions of the roller 28, of said winding means, being in the present instance engaged in the ends of bracket arms 29, pivoted at 30 to the upper ends of the vertical side members 11 of the support 10, and normally held in the horizontal projecting position by stops 31, also secured to said members 11. Accordingly, in the course of an explanation, the screen curtain 25 may be easily and quickly rolled up, as may sometimes be required, to afford a view of other inscriptions, or access to the belts 16ª, 17ª for the purpose of interchanging cards 20, 21. In teaching more advanced pupils where the danger of confusion need not be considered, the curtain 25 may be temporarily dispensed with and removed from the bracket arms 29 which are thereupon swung to the retracted or idle position shown in Fig. IV so as to be out of the way of any projecting cards 22, and to permit such cards to turn about the upper pulleys 16, 17.

In the alternative embodiment shown in Fig. X, the screen curtain 25 is mounted on a bar 32 having a pivotal connection 33 at one end with the support 10. A latch 34 notched as at 35 to engage the opposite end of the mounting 32, serves to keep the latter locked in the normal position shown with the screen curtain 25 positioned in front of the belt. After slightly lifting the mounting 32 (as permitted by virtue of the length of the pin 33ª of the pivotal connection 33) dissengagement from the latch 34 may be readily effected and the screen curtain 25 swung through an angle of 180° about the connection 33 to expose the belts 16ª, 17ª in their entirety. The latch 34 is pivoted after the manner of the brackets 29 described in connection with Figs. I–IV so as to be swingable out of the way for passage of the projecting ends of the inscription-bearing cards 22 about the upper pulleys 16—17 at the corresponding side of the structure.

In Fig. XI the support 10 is constructed somewhat differently from that of Figs. I, II and III. In this instance it includes a stem or post 36 that is sustained in upright position by a base 37, and an associated frame 38. This frame 38 has outstanding arms 39 adapted to serve as the axes for the belt pulleys 16, 17, and its vertical portion 40 is made tubular with an internal bore to fit over and about the stem 36. As a result of this construction, it will be seen that the display belts 16ª, 17ª can be bodily swung about the post 36 as required without shifting the device as a whole. The mounting 41 for the screen curtain roller 28 is here also fulcrumed on the post 36. Normally it is interlocked by a lug and notch combination at 42 so as to be directly swingable with the frame 38 when the display belts 16ª, 17ª, are bodily adjusted angularly as previously explained. However by disconnecting the lug and notch combination 42 through slight lifting of the curtain roller mounting 41, the latter may be swung independently of the frame to expose the belts.

Although I have herein shown and described but two juxtapositioned shiftable belts 16ª, 17ª, it is obvious that the number may readily be increased as required or desired in the presentation of any special subject, without departing from the scope of the invention as recited in the appended claims.

Having thus described my invention, I claim:

1. An educational chart comprising a number of independently-shiftable juxtapositioned display belts with their contiguous edges overlapping to avoid visibly-prominent breaks in the continuity of the joint display surface afforded by said belts.

2. An educational chart comprising a number of independently-shiftable endless display belts, and freely-revolvable pulleys therefor graduated in diameter so as to permit overlap of contiguous edges of adjacent belts and thereby avoid visibly-prominent breaks in the continuity of the joint display surface afforded by said belts.

3. An educational chart comprising an endless belt, pulleys to sustain the belt with capacity for ready shifting, and a series of slideways on said belt for reception of interchangeable inscription cards, said slideways being formed by spaced strips secured by stitching longitudinally thereof, and at one end by stitching extending along the belt edge to provide stops for the cards.

4. An educational chart comprising a pair of juxtapositioned endless display belts with lateral slideways for reception of interchangeable inscription-bearing cards, and pulleys to support the belts having capacity for independent shifting and with their contiguous edges overlapping for continuity of the joint display surface, the slideways on the overlapped belt being closed at the inner ends to determine the position of the cards, and the slideways on the other belt continuous for reception of longer cards and to permit such longer cards to be positioned with protruding ends thereof extending across the overlapped belt aforesaid.

5. An educational chart comprising a pair of shiftable endless slightly overlapping belts, each bearing a series of inscriptions, or indicia; pulleys to sustain the belts for movement vertically; a screen curtain with an aperture through which the inscriptions on the belts can be individually displayed; and winding means enabling the curtain to be rolled for substantially complete exposure of both belts.

6. An educational chart comprising a shiftable endless belt bearing a series of inscriptions, upper and lower pulleys defining a vertical course of travel for the belt, a screen curtain with an aperture through which the cards on the belt can be individually displayed, and pivoted means for supporting the screen curtain capable of being swung out of the way to enable passage of any projecting cards on the belt around the pulleys.

7. An educational chart comprising a shiftable endless belt bearing a series of inscriptions, upper and lower pulleys defining a vertical course of travel for the belt, a roller screen curtain with an aperture through which the inscription cards on the belt can be individuallly displayed, and a pivotal mounting enabling the curtain roller to be swung bodily out of the way to completely expose the belt.

8. An educational chart comprising a support, a shiftable endless belt bearing a series of inscriptions, upper and lower pulleys journalled on the support and defining a vertical course of travel for the belt, a roller screen curtain with an aperture through which the inscriptions on the belt can be individually displayed, a pivoted curtain roller mounting enabling the screen curtain to be swung bodily out of the way to wholly expose the belt, and means to lock the curtain roller mounting in the normal position at the front of the belt.

9. An educational chart comprising a shiftable endless inscription-bearing belt, upper and lower pulleys defining a vertical course of travel for the belt, and a support including an upright post together with an associated frame affording journals for the pulleys aforesaid swingable about said post to enable angular positional adjustment of the belt bodily.

10. An educational chart comprising a shiftable endless inscription-bearing belt, upper and lower pulleys defining a vertical course of travel for the belt, a support comprising an upright post together with an associated frame affording journals for the pulleys aforesaid swingable about the post for angular positional adjustment of the belt bodily, a roller screen curtain with an aperture through which the inscriptions on the belt can be individually displayed, and a mounting for the screen curtain roller also pivoted on the upright post to enable the screen curtain to be bodily swung independently of the belt.

11. An educational chart comprising a shiftable endless inscription-bearing belt, upper and lower pulleys defining a vertical course of travel for the belt, a support including an upright post together with an associated frame affording journals for the pulleys aforesaid swingable about the post for angular positional adjustment of the belt bodily, a roller screen curtain with an aperture through which the inscriptions on the belt can be individually displayed, a mounting for the screen curtain roller also pivoted on the upright post aforesaid to enable the screen curtain to be bodily swung independently of the belt, and means to normally lock the screen curtain mounting and the pulley-carrying frame together as a unit.

In testimony whereof, I have hereunto signed my name at Philadelphia, Pennsylvania, this 22nd day of June, 1925.

EDNA F. FELTY.